United States Patent
Warmink et al.

(10) Patent No.: US 6,611,924 B1
(45) Date of Patent: Aug. 26, 2003

(54) REDUCING CODE SIZE OF DEBUG OUTPUT STATEMENTS

(75) Inventors: Stuart Warmink, Morristown, NJ (US); Kin Ling Leung, Livingston, NJ (US); Robert D. Trachtenberg, Mountain Lakes, NJ (US); Jay Wang, Morris Plains, NJ (US); Peter Allen Dempsey, Convent Station, NJ (US); Lakshmanan Parameswaran, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/354,595

(22) Filed: Jul. 16, 1999

(51) Int. Cl.[7] .................................................. G06F 11/00
(52) U.S. Cl. ........................................ 714/38; 717/120
(58) Field of Search .............................. 714/38, 57, 46; 717/122, 124, 130

(56) References Cited

U.S. PATENT DOCUMENTS

| | | | | |
|---|---|---|---|---|
| 5,572,668 A | * | 11/1996 | See et al. ...................... 714/38 |
| 5,655,073 A | * | 8/1997 | Nishikado et al. ........... 717/124 |
| 5,771,385 A | * | 6/1998 | Harper ......................... 717/128 |
| 5,815,714 A | * | 9/1998 | Shridhar et al. ............. 717/129 |
| 5,905,892 A | * | 5/1999 | Nielsen et al. .............. 717/145 |
| 6,058,492 A | * | 5/2000 | Sample et al. ................. 714/33 |
| 6,226,786 B1 | * | 5/2001 | Hickman et al. ............ 717/124 |
| 6,418,543 B1 | * | 7/2002 | Goli et al. ..................... 714/38 |

* cited by examiner

Primary Examiner—Robert Beausoliel
Assistant Examiner—Bryce P. Bonzo

(57) ABSTRACT

The source code for a computer program contains a plurality of debug output statements that provide a debug output string when the computer program is running. Each debug output statement comprises a fixed-content text string field which is provided in the debug output string. The fixed-content text string field of each debug output statement is replaced with a unique text string number to provide stripped source code. A number-to-string mapping table for translating each unique text string number into a corresponding fixed-content text string is constructed. The stripped source code is compiled to provide stripped object code.

The stripped object code for the computer program is run on a target computer. A debug computer receives debug output strings from corresponding debug output statements of the computer program, each debug output string having a unique text string number. The debug computer translates the unique text string number for each debug output string into a corresponding text string using the number-to-string mapping table, and replaces the unique text string number in the debug output string with the corresponding text string to provide an un-stripped debug output string. The debug computer displays the un-stripped debug output string.

20 Claims, 2 Drawing Sheets

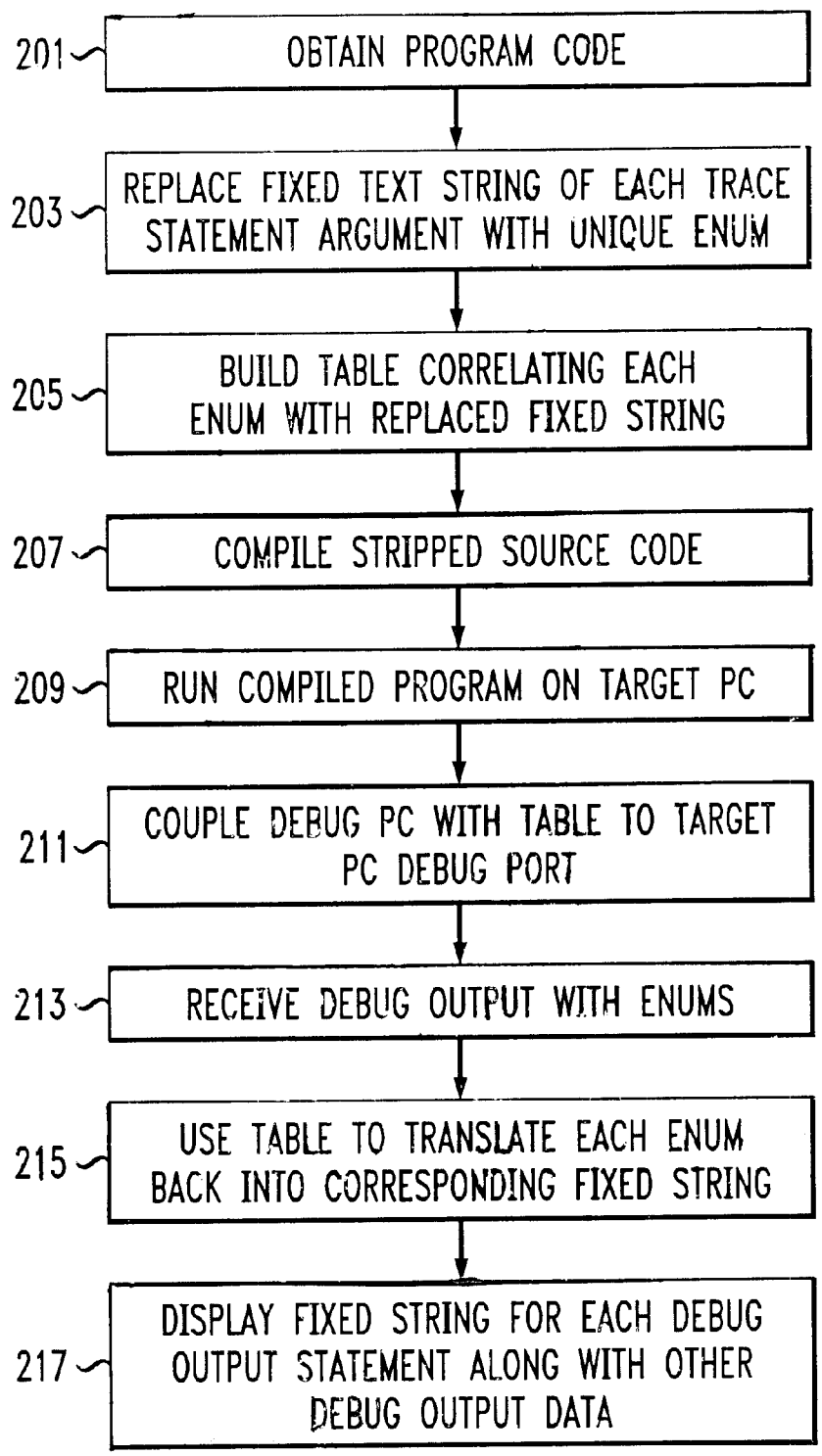

REDUCING CODE SIZE OF DEBUG OUTPUT STATEMENTS

BACKGROUND OF THE INVENTION

1. Field of the Invention

The present invention relates to computer.programming and, in particular, to methods for debugging software programs during development and after deployment.

2. Description of the Related Art

Computer programs (software) are typically developed by programmers (program developers) writing the code for the program with the aid of various debugging or debug techniques. For example, when a program under development is compiled and does not run properly, it must be debugged to determine the coding error. Debugging, therefore, refers to analysis of program operation to determine where coding errors are in the source code and to subsequent modifications to the program to avoid the problems caused by the or other errors.

Further, after a version of a program is compiled and implemented, if a problem develops there is also a need to perform "field debugging". Field debugging refers to debugging an already-existing program which has already been developed, compiled, and provided to an end user or customer for use. For example, a program is developed during a development phase by program developers, during which phase debugging is performed in attempt to ensure that the program runs properly and robustly. Thereafter, a final version of the program code is compiled and shipped to various end users. The end users install the software on end use or "target" computer systems. When a problem is reported by the user, software developers need to analyze the program as implemented in the users' computer system and environment to attempt to debug the remaining errors.

In some cases, some conventional debugging techniques or debuggers are not useful because, for example, the debugger requires the code to be paused while running or to run at less than emulations speeds, which can compromise the result for some types of programs where it is important that the program not be paused or run at less than full speed.

A debugging technique employing print statements is sometimes used, which does not pause the program while it is being tested or run. In the print statement approach, print statements are embedded at strategic locations within the code. These are designed to print out the current values of various variables, program states, and the like, typically along with an explanatory accompanying text message. A typical print statement, for example, might be PRINT("I AM IN STATE", StateID), where the StateID parameter is a current state of the program code. The use of print statements in this manner allows the program developer to track the progress of the code without using additional debuggers or emulators.

Such debug output (debug output string) is typically routed to designated pins of a special debug port, e.g. on the backplane of the computer (e.g., a PC) which is running the program. A terminal may be coupled thereto so that the program developer can view the output of the debug print statements on a monitor of the terminal. The debug port is typically not intended for access by customers.

A print statement is typically a defined statement in the high-level programming language (e.g., C++) in which the program developer works to develop the program code. Thus, when the program is running (after it is compiled), when the instruction corresponding to the print statement is reached during program flow, it is always executed, like any other statement. The print statement is typically "blocking," meaning that it has priority until the print is completed, and thus blocks other processing of the processor. Thus, the use of print statements for debugging purposes is not without cost, because such statements can take up a substantial portion of the program code and CPU (central processing unit, or processor) time or processing bandwidth (e.g., 10% of each), thereby slowing down the execution of the program when it is running. CPU time is required, for example, for formatting and copying the resulting debug output string into a trace buffer, which is used to temporarily buffer, format, store, and display debut output strings produced.

In an attempt to gain the advantage of the print statement debug strategy without its attendant disadvantages, the print statements are sometimes removed from the program code after the code is completed, and prior to its final compile. This may be done, for example, by using a print macro which, during code development, contains the standard print statement. Before compiling the final version of the program and shipping the compiled code (which comprises instructions) to the customer or end user, the debug print macro definition is changed to null or nothing (this is sometimes referred to as compiling the macro to null). One drawback of this approach, however, is that if there is subsequently a problem "in the field," the compiled code for the final program will not contain the previously-used debug print statements and thus will not be providing the debug data at the debug port. Thus, the program developer will not have access to this useful debugging data. Another problem with this approach is that the behavior of the computer system running the program, especially with respect to timing, is different for the final version (which has the macro compiled out) than for the version used during testing and development (which has the macro compiled in).

A modification of the above debug print statement approaches involves using a special macro, which may be referred to as a "trace" macro, which contains print statements which are selectively enabled based on developer-selected masks, based on some specified rules of filtering. The trace macro may be referred to as a trace statement for simplicity, even though trace is not a defined statement in the programming language. Thus, each trace statement provides a filterable debug output, i.e. a debug output which can be selectively enabled based on certain masks. Like a print statement, a trace statement can be used to cause various messages or other debug information to be printed or displayed on a monitor.

Each trace statement may be one of one or more classes or types of trace statements, where the mask set is able to selectively enable or disable certain trace classes. For example, each program under development may have several major software or code objects or portions, each of which may have a different code developer. Each such object may be assigned its own trace identifier (TraceID), so that only the trace statements for a given software object are enabled. Subsets of the trace statements for a particular object may be selected by applying a mask to further subdivide the trace statements which can be selectively enabled. The trace statements in a given set of code may thus be grouped according to the code object in which it resides or according to the developer of that code. Thus, the use of such debug trace statements allows the program developer to specify and thus enable only the subset of debug messages which are of interest.

Unlike a print statement, which is always executed by the processor and which is blocking, a trace statement is a request to send something to be printed. This request is queued, and the information is either printed or not, based on a trace filter which indicates whether or not the particular trace category to which the trace statement belongs is of interest (has been enabled or set). The use of trace macros or statements provides some savings in terms of CPU usage, since if some or all of the trace statements are disabled, then less CPU time is required. Further, trace statements are often implemented on a separate thread and thus non-blocking of more important system operations and of lower priority than print statements, which are inherently on the calling thread. Trace statements therefore do not interrupt higher priority processing.

Nevertheless, when trace statements are employed, some CPU time is still required, if only to queue each trace statement's conditional print request and to check to determine if its mask is set or not. Thus, even if all the trace statements are disabled (the default for a completed, compiled program already shipped to customers and running "in the field"), the computer still runs more slowly than it would if it had no trace statements. Further, the code size problem encountered when using debug print statements is not improved by using trace statements, since each trace macro is still compiled into the code.

Trace statements may be compiled to null before final compilation and shipping to customers, as described above with respect to print statements, but again the problem with this approach is that the code developer is denied the use of the debug output diagnostics in the field.

As explained above, the debug port is typically not intended for access by customers, whether the debug output is provided from print statements or trace statements. Further, the default mask or filter setting for trace statements is off, to further prevent unauthorized users such as customers from gaining access to the debug output. One problem that can arise when providing debug output on the debug port is that a customer gains access to this information and is confused by the debug messages, and erroneously believes there is a bug or problem with the program. This can annoy, confuse, frustrate the customer and/or cause him to complain to the vendor.

SUMMARY

The source code for a computer program contains a plurality of debug output statements for providing debug output strings, each debug output statement comprising a fixed-size text string. The text string of each debug output statement is replaced with a unique text string number to provide stripped source code. A number-to-string mapping table for translating each unique text string number into a corresponding text string is constructed. The stripped source code is compiled to provide stripped object code.

The stripped object code for the computer program is run on a target computer. A debug computer receives debug output strings from corresponding debug output statements of the computer program, each debug output string having a unique text string number. The debug computer translates the unique text string number for each debug output string into a corresponding text string using the number-to-string mapping table, and replaces the unique text string number in the debug output string with the corresponding text string to provide an un-stripped debug output string. The debug computer displays the un-stripped debug output string.

BRIEF DESCRIPTION OF THE DRAWINGS

FIG. 2 is a flow chart illustrating a method of debugging a program running on the computer of the computer system of FIG. 1, in accordance with an embodiment of the present invention.

DESCRIPTION OF THE PREFERRED EMBODIMENT

Figure 1:
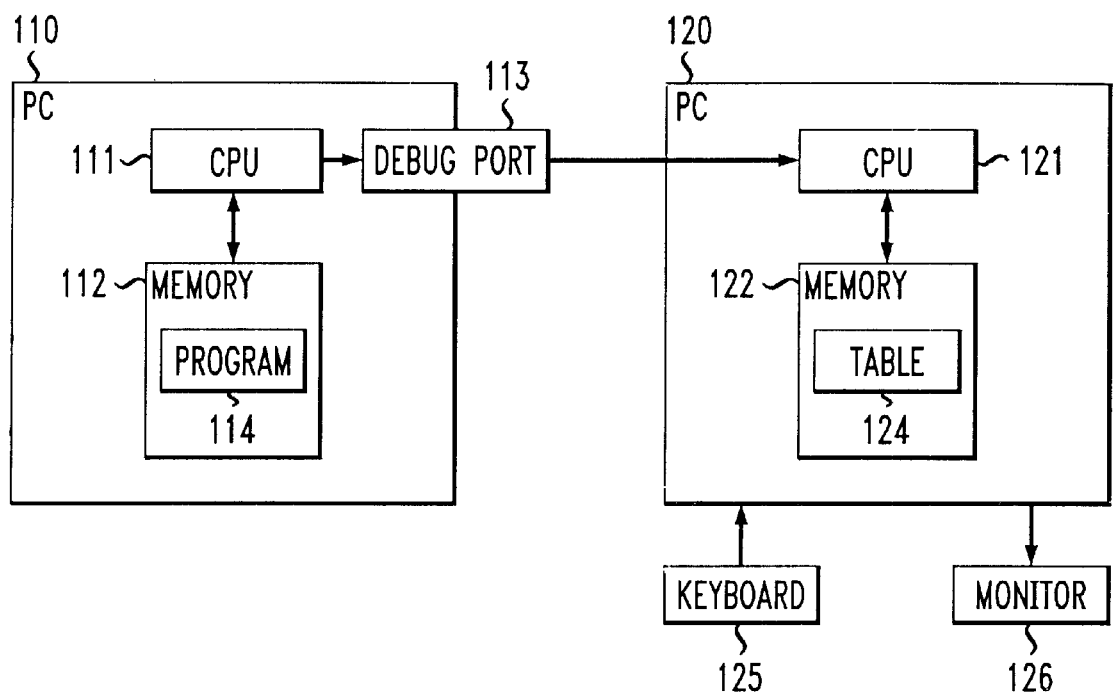
FIG. 1 is a block diagram of a computer system having a computer and a debug computer, in accordance with an embodiment of the present invention.

As described in further detail below with reference to FIGS. 1 and 2, in the present invention, the fixed text string portion of the argument of each debug trace statement is replaced before the final compile with a unique number, to reduce the code space required by the trace statements and to reduce the amount of CPU time required to print out the debug information for that trace statement. During this replacement or stripping process, a table is made which maps the numbers back to the strings. When the compiled program is run on a target or host machine or computer, the debug output string for each selected or enabled trace statement contains the shorter integers in place of the longer text strings previously stripped out.

A "front end" trace browsing interface (debug program) running on a separate computer (a monitoring or debug computer) has access to the table, receives the debug output string from the target computer, and uses the table to map each integer to its corresponding text string, so that the appropriate text strings are substituted back for the integers before display on a monitor. The trace browser reconstructs the traces dynamically by retrieving information from the previously-created trace mapping table. The code developer thus sees the same output debug text string messages and accompanying data (e.g., state IDs) on the monitor just as if the replacement/stripping of the present invention had not been employed. Thus both the compiled code size and CPU time required to process the trace statements is greatly reduced. Moreover, the debug messages are rendered indecipherable to a customer or unauthorized user not having access to the trace browser and debug table, thereby avoiding the potential customer confusion problem noted previously.

Referring now to FIG. 1, there is shown a block diagram of a computer system 100 having a target computer 110 and a debug computer 120, in accordance with an embodiment of the present invention. Target computer 110 may be a PC (personal computer) or workstation, as may be debug computer 120. Target computer 110 is, for example, a PC of a customer used to run a final, compiled consumer or end user version of a given program 114, which has been previously developed and debugged. Target computer 110 contains CPU 111, memory 112, and debug port 113. Memory 112 stores program 114 and may be, for example, a Flash EEPROM or other type of memory, such as CD-ROM, ROM, or hard disk drive, which is suitable for storing computer program instructions which can be accessed to be run by CPU 111.

Debug computer 120 can be coupled to debug port 113 of target computer 110 to receive any debug output from the port. Debug computer contains a CPU 121 and memory 122, and may be coupled to input peripherals such as keyboard 125, and an output display device such as monitor 126. Memory 122 contains number-to-string mapping table 124, and may be a Flash EEPROM or other type of memory suitable for storing table data. CPU 121 of debug computer 120 runs the trace browser which has access to number-to-string mapping table 124.

A typical trace statement takes the following form: TRACE(TEXT MESSAGE, PROGRAM DATA), where the argument of the trace statement has two fields. The first field is a field typically having a string of ASCII text or characters, which introduces or explains the debug output data provided by the trace statement. The length of the text field varies from trace statement to trace statement since the introductory or explanatory text message is typically different from trace statement to trace statement. However, for a given trace statement, this field's size and content is fixed or known at compile time and does not vary from run to run. Thus, each debut output statement (trace statement) provides a debug output string having a fixed-content text string field. The fixed-content text string field for each debug output statement may vary in size from statement to statement and even from compile to compile as the code developer modifies the program code and the debug output statements, but each fixed-content text string field is fixed at compile time and does not change from run to run.

The program data field is typically of a relatively short or fixed length, and is some program variable which provides some data dynamically when called. Thus the length of this field is roughly fixed from trace statement to trace statement, while the content or actual data it produces varies even for the same trace statement, depending on the actual value of the program data variable when the trace statement is executed. For example, the text message may simply be a sentence or clause formed of ASCII text characters, and the program data variable may be a program state. A typical trace statement, for example, might be TRACE("I AM IN STATE", StateID), where the StateID parameter is a current state of the program code.

When a program being run comes to such a trace statement, the various instructions of the more complex trace macro are actually run. This includes performing instructions to test to see whether the class of trace statements to which the current trace statement belongs has been enabled, for example by looking at the selectable mask settings. The trace macro contains a conditional print statement, which also prints out the same arguments as used in the trace statement. Thus, if the trace statement is enabled, it prints out to the attached monitor 126 via debug port 113 the text string, followed by the actual value of the program variable (e.g. StateID). Trace macros typically also provide, when they are enabled to print out the foregoing information, other data such as a time-stamp, object ID, and the like. In one embodiment, each trace statement provides a debug output string (when enabled) which contains several fields of data in the following format:

<Time Stamp> <Sequence Number> <File Name> <Line No.> <Object ID>
    <User String> <Compile Version Number>

The time stamp includes the current time at which the print of the debug output string occurs, the sequence number is an automatically-generated number indicating which trace statement this is in numerical order (e.g., the 51 st), the file name identifies the source file name of the file containing the code, the line number identifies the line number of the trace macro, the object ID identifies the abbreviated identifier or owner of the object or trace statement (e.g., the particular developer who put in the trace statement into his portion of code during development, and/or the portion of code in which the trace statement resides), an arbitrary user string that may include current variable values (e.g., the text message plus the program data variable such as StateID, and the compile version number is the number of the current version of the program that has been coded and compiled. In other embodiments, different types of data may be automatically provided each time a trace statement provides a debug output string, or may only provide the text message, the program data variable, and the compile version number.

Thus, each enabled trace statement causes a debug output string to be provided at debug port 113. The debug output string includes the text string as well as the current content or value of the program data variable of that trace statement. In the present invention, a "stripped" debug output string is provided instead, which includes an ENUM representing the text string, instead of the text string itself. An ENUM is an enumerated integer, i.e. one of a subset of the integer set, where the ENUM set contains all "legal" or defined values of the set. The variable data portions of the output string are not stripped out but remain, with the ENUM, in the output string.

As can be seen, the text message typically contains the largest portion of data in the trace statement's argument field. For example, the StateID may simply be a single integer number, and other fields may also be single integer numbers or otherwise small numbers of digits. Each character of the text message, however, requires a byte of data and thus the bulk of the code size represented by each trace macro is caused by the fixed text data of the text message portion of the trace statement. This also requires the bulk of the CPU time required to process and print the debug data. For example, more memory and code size is required to store data corresponding to the thirteen characters "I AM IN STATE" than in the single byte for the value of the StateID variable. For even longer introductory or explanatory text messages, the text data portion dominates the memory and CPU resources that have to be devoted to the trace statement.

Referring now to FIG. 2, there is shown a flow chart illustrating a method 200 of debugging a program running on target computer 110 of computer system 100 of FIG. 1, in accordance with an embodiment of the present invention. Although the text message is the largest portion of the trace statement's argument, it is also fixed in length and content for each trace statement. The present invention exploits this fact by removing or stripping out all of these text message or fixed field portions of debug trace statement arguments, and replacing them with unique numbers. Thus, source code is first obtained (step 201). This is typically the final version of the source code after development phase debugging, just before the code is ready for final compiling and shipping to end users.

Next, the source code is run through a debug strip tool or program in accordance with the present invention, to identify each trace statement and its fixed text string portion. This debug strip program may be run on a PC (e.g., the same PC on which programming and debugging has been performed to write the program code) and provided with the file name of the completed source code. Each of the fixed text strings in the argument portions of trace statements in the source code is replaced with a unique number, such as an ENUM (step 203). This involves deleting the text string, inserting the next ENUM in the sequence (and incrementing the ENUM to the next one as necessary), and saving both the text string and the ENUM corresponding to that text string. The variable data portions of the output string are not stripped out but remain, with the ENUM, in the output string.

After this is completed, the entire program source code has been stripped of the long fixed text strings in the arguments of all the debug trace statements, and replaced with single-byte integer ENUMs. Thus, the entire code size is shorter, and the trace statements can be processed and printed much faster since it is quicker to process and print a single ENUM value than an entire string of text. In addition, at the end of this step, the debug strip program has stored in memory a series of pairs of data, i.e. the text string stripped from each trace statement along with the corresponding ENUM assigned to that trace statement. A number-to-string mapping table 124 is constructed from this data (step 205), and stored as a database or in some other usable form. This may be used to output a text string corresponding to an input ENUM, i.e. it maps integers or ENUMs into text strings.

For example, an ENUM set may be defined by the debug strip program to include the positive integers from 1 to 200. Suppose the 50th trace statement is: TRACE("THE FOLLOWING NUMBER REPRESENTS THE CURRENT STATE OF THE STATE REACHED AFTER THE TRANSLATION OPERATION IS COMPLETED WHEN THE USER REQUEST TRANSLATION BUT BEFORE THE HELP OPTION IS SELECTED BY THE INTERRUPT ROUTINE:", StateID). After the debug strip program has stripped the program source code, the 50th trace statement is: TRACE(50, StateID), where "50" can be represented as a single byte or word. Number-to-string mapping table 124 contains an entry correlating the ENUM value "50" to the text string previously contained in that trace statement. Thus, if the value "50" is provided as an input to the table, it provides an output text string equal to that originally provided in the trace statement. It is noted that even longer text strings may be used, and in fact a program developer is freer to use longer text messages to more clearly explain the program variable data to follow, because no matter how long the text message portion of the trace statement is, after running the debug strip program, the text message will have been replaced by a single byte or word. Thus, the present invention frees up the program developer to use more descriptive, richer, and longer explanatory text messages in debug output trace statements.

The shorter, stripped program code may then be compiled to provide executable object code, which is then shipped to customers or other end users and eventually run on a target PC 110 (steps 207, 209). The executable program 114 is stored in memory 112, and run by CPU 111 of PC 110, as described previously. When a problem is detected, debug PC 120 is provided which contains a trace browser and number-to-string mapping table 124 stored in memory 122. Number-to-string mapping table 124 typically also includes data such as the compile version number for the program version when the table was constructed. This may be used to ensure that the compile version number provided by each trace statement debug output data is the same as that of number-to-string mapping table 124. This checking of the compile version number is needed because the number of trace statements and content of their text string portions may vary from compiled version to version of the program, as debug trace statements are added or deleted or modified when revising the program.

The debug PC 120 is coupled to debug port 113 of PC 110, to receive any debug output strings provided from enabled or selected trace statements of program 114 (step 211). The trace browser running on PC 120 typically contains a menu for the developer to select (enable) certain classes of trace statements. Program 114 is then run on CPU 111 and whenever a selected trace statement is encountered, a string of debug output data is provided via debug port 113 and received by CPU 121 of debug PC 120. Thus, debug PC 120 intercepts the indecipherable "stripped" debug output strings, and converts the string's ENUM value to its corresponding text string using number-to-string mapping table 124 (step 215). The text string, not the ENUM value, is thus inserted in the appropriate place in the debug output string of data and displayed on monitor 126 along with the other data of the debug output string.

Thus, the trace browser converts stripped debug output strings into un-stripped or normal debug output strings, using table 124, before display of the string. Target PC 110 never sees, stores, or processes the actual strings, thereby reducing the amount of memory 112 required to store program 114 and reducing the workload on CPU 111.

The debug technique of the present invention therefore provides an interface that allows software developers to gain visibility into the execution of the code on a fully-functioning computer system running at normal operating speed. This facility complements the services provided by a source-level code debugger. While the latter is useful for investigating code behavior at a very low level (e.g., setting break points at a particular code address and examining particular variables), the present invention provides a way to observe the behavior of the system at a higher level, with minimal impact on system behavior. Source-level code debuggers tend to be used towards the early stages of testing. It requires the build to be built specially in order to be usable, whereas the debug facility of the present invention does not. The debug technique of the present invention can be used in all stages of testing, including testing in the field. By contrast, testing using source-level code debuggers typically requires understanding of the code and source listings need to be available, and is not usable for field debugging.

The debugging technique allow the use of more descriptive trace statements, as described above, yet without wasting more system memory or resources, because the text strings, whatever their length, are stripped out and not present in the object code. In addition, the present approach not only saves memory by encoding the trace character strings as integers, it helps control trace real-time usage. This is because the trace browser may also monitor the number of times a trace is invoked in a particular run. (This helps the developer prioritize traces for removal when code needs to be reworked for improved performance.) Another advantage is that the developer can build in much user-friendliness into the trace browser so that an individual developer may be able to easily mask or log the traces in a variety of ways. For example, one may selectively mask traces based on time stamps, locations, or functionality with a user interface so that it is not necessary to memorize the masks.

A further advantage of the present invention is that the map of strings to integers is unique for each particular compile. Thus, by using the compile version number, or a "random" number used at the point of compile, the present invention provides a way to validate that the tool running on the monitoring computer has the same version as is in the target computer running the code.

In addition, other than having to run the decoding tool on a special monitoring computer, the programmer cannot tell that the output is not left in the original program as strings. The existence and operation of the invention is thus transparent to the programmer or developer.

In an alternative embodiment, to minimize the size of table 124 and to avoid redundancy, the same ENUM is assigned to each trace statement having the identical text string.

The present invention may also be used with debug print statements instead of with debug trace statements. The term "debug output statements" may be used to refer to both debug print statements and debug trace statements and, generally, to any statement, instruction, or macro embedded into code and used to print out debug information, in particular, debug output strings. In the present invention the text string portions of such debug output statements are stripped out and replaced by shorter numbers, and a mapping table is built that can be used by a trace browsing application to un-strip the stripped debug output strings before displaying them.

In the embodiments described above, the debug output statement's text string portion, which is fixed in both size and content for each debug output statement, is replaced with the unique ENUM to provide stripped source code, thereby decreasing the code length and reducing the processing burden of processing the code when the program is running on a processor. In an alternative embodiment, any other fields of the debug output statement which are fixed in size and content may be stripped out along with the text string. For example, the <File Name>, <Line No.>, and <Object ID> fields all contain fixed size and content data at the time of compile. Thus, these fields as well as the text string may all be replaced with the unique ENUM, and the mapping table will contain all of the stripped out data (e.g., the text field as well as the file name, line number, and object ID) in the entry corresponding to the ENUM for that debug output statement. In this embodiment, the size of the debug output statements in code is reduced even further, and all fixed-content portions of the debug output statement's output are replaced by a unique ENUM and the number-to-string mapping table is constructed and used to translating each ENUM back into the stripped out data, i.e. the text string plus the other fixed-content fields.

The present invention therefore advantageously allows a code developer dynamically change the debug output statements (e.g. trace statements) used for debugging purposes, each time the program is compiled. This is because no matter what the current set of trace statements is or how they are distributed throughout the code, and no matter what fixed content fields are contained in the trace statements, the fixed content portions are stripped out every compile, and a new mapping table is dynamically created for each compile. This provides the code developer with flexibility of changing, adding, or deleting trace statements during code development, as needed, while instantly providing the reduced-code savings and the mapping table used to decipher the ENUMs output by the running program.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method, comprising the steps of:
   (a) receiving a source code for a computer program, the source code comprising a plurality of debug output statements, wherein each debug output statement is for providing a debug output string when the computer program is running, each debug output statement comprising a fixed-content text string field which is provided in the debug output string;
   (b) replacing the fixed-content text string field of each debug output statement with a unique text string number to provide stripped source code; and
   (c) constructing a number-to-string mapping table for translating each unique text string number into a corresponding fixed-content text string.

2. The method of claim 1, wherein:
   each debug output statement comprises at least a second fixed-content data field which is provided in the debug output string;
   the fixed-content text string field and the at least second fixed-content data field of each debug output statement are replaced with the unique text string number; and
   the number-to-string mapping table is for translating each unique text string number into the corresponding fixed-content text string and at least second fixed-content data field.

3. The method of claim 1, wherein each debug output statement is a print statement.

4. The method of claim 1, wherein each debug output statement is a trace statement macro having a selectable debug output.

5. The method of claim 4, wherein each debug output statement comprises a compile version number field for providing the compile version number for the computer program in the debug output string.

6. The method of claim 1, comprising the further steps of:
   (d) compiling the stripped source code to provide stripped object code.

7. The method of claim 6, further comprising the steps of:
   (e) running the stripped object code for the computer program on a target computer;
   (f) receiving, with a debug computer, debug output strings from corresponding debug output statements of the computer program, each debug output string having a unique text string number;
   (g) translating the unique text string number for each debug output string into a corresponding text string using the number-to-string mapping table;
   (h) replacing the unique text string number in the debug output string with the corresponding text string to provide an un-stripped debug output string; and
   (i) displaying the un-stripped debug output string.

8. The method of claim 1, wherein each unique number is one of a predefined ENUM set of integers.

9. A system comprising:
   (a) means for receiving a source code for a computer program, the source code comprising a plurality of debug output statements, wherein each debug output statement is for providing a debug output string when the computer program is running, each debug output statement comprising a fixed-content text string field which is provided in the debug output string;

(b) means for replacing the fixed-content text string field of each debug output statement with a unique text string number to provide stripped source code;

(c) means for constructing a number-to-string mapping table for translating each unique text string number into a corresponding fixed-content text string; and (d) means for compiling the stripped source code to provide stripped object code.

10. The system of claim 9, wherein: each debug output statement comprises at least a second fixed-content data field which is provided in the debug output string;

the fixed-content text string field and the at least second fixed-content data field of each debug output statement are replaced with the unique text string number; and the number-to-string mapping table is for translating each unique text string number into the corresponding fixed-content text string and at least second fixed-content data field.

11. The system of claim 9, wherein each debug output statement is a print statement.

12. The system of claim 9, wherein each debug output statement is a trace statement macro having a selectable debug output.

13. The system of claim 12, wherein each debug output statement comprises a compile version number field for providing the compile version number for the computer program in the debug output string.

14. The debug computer of claim 12, wherein each debug output statement comprises a compile version number field for providing the compile version number of the computer program in the debug output string and the number-to-string mapping table comprises a second compile version number for the a computer program version compiled to create the number-to-string mapping table, the debug computer further comprising means for comparing the compile version number provided in the debug output string to the second compile version number to ensure that the number-to-string mapping table corresponds to the computer program.

15. The system of claim 9, further comprising:

(d) means for compiling the stripped source code to provide stripped object code.

16. The system of claim 15, further comprising:

(e) a target computer for running the stripped object code for the computer program; and (f) a debug computer for receiving debug output strings from corresponding debug output statements of the computer program, each debug output string having a unique text string number, the debug computer comprising:

(1) means for translating the unique text string number for each debug output string into a corresponding text string using the number-to-string mapping table;

(2) means for replacing the unique text string number in the debug output string with the corresponding text string to provide an un-stripped debug output string; and (3) means for displaying the un-stripped debug output string.

17. The system of claim 9, wherein each unique number is one of a predefined ENUM set of integers.

18. A debug computer for debugging a computer program having object code running on a target computer, the debug computer comprising:

(a) means for receiving stripped debug output strings provided by corresponding debug output statements of the computer program, each debug output string having a unique text string number;

(b) a number-to-string mapping table for translating the unique text string number of each debug output string into a corresponding text string;

(c) means for replacing the unique text string number in the debug output string with the corresponding text string to provide an un-stripped debug output string; and (d) display means for displaying the un-stripped debug output string.

19. The debug computer of claim 18, wherein:

each debug output statement comprises at least a second fixed-content data field which is provided in the debug output string;

the fixed-content text string field and the at least second fixed-content data field of each debug output statement are replaced with the unique text string number; and the number-to-string mapping table is for translating each unique text string number into the corresponding fixed-content text string and at least second fixed-content data field.

20. The debug computer of claim 18, wherein each unique number is one of a predefined ENUM set of integers.

* * * * *